US007356777B2

(12) United States Patent
Borchardt et al.

(10) Patent No.: US 7,356,777 B2
(45) Date of Patent: Apr. 8, 2008

(54) SYSTEM AND METHOD FOR PROVIDING A DYNAMIC USER INTERFACE FOR A DENSE THREE-DIMENSIONAL SCENE

(75) Inventors: Jonathan M. Borchardt, Seattle, WA (US); Edward L. Walter, Bainbridge Island, WA (US)

(73) Assignee: Attenex Corporation, Seattle, WA (US)

( * ) Notice: Subject to any disclaimer, the term of this patent is extended or adjusted under 35 U.S.C. 154(b) by 548 days.

(21) Appl. No.: 11/044,158

(22) Filed: Jan. 26, 2005

(65) Prior Publication Data

US 2006/0164409 A1 Jul. 27, 2006

(51) Int. Cl.
G06T 15/00 (2006.01)
(52) U.S. Cl. ............ 715/836; 715/798; 715/800; 715/849; 715/850; 345/441; 345/442; 345/654
(58) Field of Classification Search .......... 715/798, 715/800, 801, 810, 834, 848–852; 345/441–443, 345/418, 653, 654
See application file for complete search history.

(56) References Cited

U.S. PATENT DOCUMENTS

| 5,056,021 | A | 10/1991 | Ausborn |
| 5,488,725 | A | 1/1996 | Turtle et al. |
| 6,173,275 | B1 | 1/2001 | Caid et al. |
| 6,446,061 | B1 | 9/2002 | Doerre et al. |
| 6,510,406 | B1 | 1/2003 | Marchisio |
| 6,560,597 | B1 | 5/2003 | Dhillon et al. |
| 6,675,159 | B1 | 1/2004 | Lin et al. |
| 6,701,305 | B1 | 3/2004 | Holt et al. |
| 6,711,585 | B1 | 3/2004 | Copperman et al. |
| 2004/0172600 | A1* | 9/2004 | Evans .................. 715/517 |

FOREIGN PATENT DOCUMENTS

WO    WO 03073331 A2 *  9/2003

OTHER PUBLICATIONS

Almir Olivette Artero and Maria Cristina Ferreira de Oliveira, Viz3D: Effectgive Exploratory Visualization of Lage Multidimensional Datasets, Oct. 20, 2004, IEEE, Computer Graphics and Image Processing 2004, pp. 340-347.*

(Continued)

*Primary Examiner*—Beatriz Prieto
*Assistant Examiner*—Patrick F Riegler
(74) *Attorney, Agent, or Firm*—Patrick J. S. Inouye; Scott E. Smith

(57) ABSTRACT

A system and method for providing a dynamic user interface for a dense three-dimensional scene is presented. Clusters are placed in a three-dimensional scene arranged proximal to each other such cluster to form a cluster spine. Each cluster includes one or more concepts. Each cluster spine is projected into a two-dimensional display relative to a stationary perspective. Controls operating on a view of the cluster spines in the display are presented. A compass logically framing the cluster spines within the display is provided. A label to identify one such concept in one or more of the cluster spines appearing within the compass is generated. A plurality of slots in the two-dimensional display positioned circumferentially around the compass is defined. Each label is assigned to the slot outside of the compass for the cluster spine having a closest angularity to the slot.

21 Claims, 19 Drawing Sheets

OTHER PUBLICATIONS

Maria Cristin Ferreira de Oliveira and Haim Levkowitz, From Visual Data Exploration to Visual Data Mining: A Survey, Jul.-Sep. 2003, IEEE,IEEE Transactions onVisualization and Computer Graphics vol. 9, No. 3, pp. 378-394.*

Andreas Rauber and Dieter Merkl, Text Mining in the SOMLib Digital Library System: The Representation of Topics and Genres, 2003 Kluwer Academic Publishers, Applied Intelligence 18, pp. 271-293.*

Anna Sachinopoulou, Mutidimensional Visualization, 2001 VTT Publishers, VTT Research Notes 2114, pp. 1-37.*

R.E. Horn, "Visual Language: Global Communication For The 21st Century," 1998, Ch. 3, MacroVU Press, Bainbridge Island, WA, USA.

H. Kawano, "Overview Of Mondou Web Search Engine Using Text Mining And Information Visualizing Technologies," IEEE, 2001, pp. 234-241.

J. Osborn et al., "Justice: A Judicial Search Tool Using Intelligent Concept Extraction," ICAIL, 1999, pp. 173-181, ACM, Oslo, Norway.

C. Yip Chung et al., "Thematic Mapping-From Unstructured Documents To Taxonomies" CIKM, Nov. 4-9, 2002, pp. 608-610, McLean, Virginia, USA.

C. An et al., "Fuzzy Concept Graph And Application In Web Document Clustering," IEEE, 2001, pp. 101-106.

A. Strehl and J. Ghosh: "Cluster Ensembles—A Knowledge Reuse Framework for Combining Partitionings" Journal of Machine Learning Research, vol. 3, No. 12, Dec. 2002, pp. 583-617, XP002390603 Cambridge, MA, USA ISSN: 1533-7928.

Estivill-Castro V et al.: "Amoeba: Hierarchical Clustering Based on Spatial Proximity Using Delaunaty Diagram", Proceedings of the International Symposium on Spatial Data Handling, XX, XX, pp. 1-16, XP000962779. Department of Computer Science, The University of Newcastle, Australia, 2000.

Bier E A et al.: "Toolglass and Magic Lenses: The See-Through Interface" Computer Graphics Proceedings, Proceedings of Siggraph Annual International Conference on Computer Graphics and Interactive Techniques, Aug. 1993, pp. 73-80, XP000879378.

Bernard M et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809 ISBN: 0-7695-1988-1.

* cited by examiner

170

180

250

260

SYSTEM AND METHOD FOR PROVIDING A DYNAMIC USER INTERFACE FOR A DENSE THREE-DIMENSIONAL SCENE

FIELD OF THE INVENTION

The invention relates in general to user interfaces and, in particular, to a system and method for providing a dynamic user interface for a dense three-dimensional scene.

BACKGROUND OF THE INVENTION

Text mining can be used to extract latent semantic content from collections of structured and unstructured text. Data visualization can then be used to model the extracted semantic content, which transforms numeric or textual data into graphical data to assist users in understanding underlying principles. For example, clusters group related sets of concepts into a single graphical element that can be mapped into the graphical screen. When mapped into multi-dimensional space, the spatial orientation of the clusters can reflect similarities and relatedness of clusters. However, artificially mapping the clusters into a three-dimensional scene or a two-dimensional screen can present potential problems. For instance, a viewer could misinterpret dependent relationships between discrete clusters displayed adjacently or erroneously interpret dependent variables as independent and independent variables as dependent. Similarly, a screen of densely-packed clusters can be difficult to understand and navigate, particularly where textual labels are annotated to overlie the cluster directly. Other factors can further complicate the perception of visualized data, such as described in R. E. Horn, "Visual Language: Global Communication for the $21^{st}$ Century," Ch. 3, MacroVU Press (1998), the disclosure of which is incorporated by reference.

Moreover, data visualization is constrained by the physical limits of the screen system used. Two-dimensional visualized data can be readily displayed, yet visualized data of greater dimensionality must be artificially projected into two-dimensions when displayed on conventional display devices. Careful use of color, shape and temporal attributes can simulate multiple dimensions, but comprehension and usability become difficult as additional layers of modeling are artificially grafted into a two-dimensional screen space and display density increases. In addition, large sets of data, such as email stores, document archives and databases, can be content rich and can yield large sets of clusters that result in a complex screen. Display, however, is limited and large cluster sets can appear crowded and dense, thereby hindering understandability. To aid navigation through the display, the cluster sets can be combined, abstracted or manipulated to simplify presentation, but semantic content can be lost or skewed.

Moreover, complex graphical data can be difficult to comprehend when displayed alone and without textual references to underlying content. The user is forced to remember "landmark" clusters and similar visual cues by screen position alone, which can be particularly difficult with large cluster sets. The visualized data can be annotated with text, such as cluster labels, to aid comprehension and usability. However, annotating text directly into a graphical display can be cumbersome, particularly where the clusters are densely packed and cluster labels overlay or occlude the display. A more subtle problem occurs when the screen is displaying a two-dimensional projection of three-dimensional data and the text is annotated within the two-dimensional space. Relabeling the text based on the two-dimensional representation can introduce misinterpretations of the three-dimensional data when the display is reoriented. Also, reorienting the display during data evaluation can cause a shuffling of the displayed clusters and a loss of user orientation. Furthermore, navigation within such a display can be unintuitive and cumbersome, as cluster placement is driven by available display and the provisioning of labels necessarily overlays or intersects placed clusters.

Therefore, there is a need for an approach to providing a focused display of dense visualized three-dimensional data representing extracted semantic content as a combination of graphical and textual data elements. Preferably, such an approach would provide a user interface facilitating convenient navigation as a heads-up display (HUD) logically provided over the visualized data and would enable large- or fine-grained data navigation, searching and data exploration.

SUMMARY OF THE INVENTION

An embodiment provides a system and method for providing a user interface for a dense three-dimensional scene. Clusters are placed in a three-dimensional scene arranged proximal to each other such cluster to form a cluster spine. Each cluster includes one or more concepts. Each cluster spine is projected into a two-dimensional display relative to a stationary perspective. Controls operating on a view of the cluster spines in the display are presented. A compass logically framing the cluster spines within the display is provided. A label to identify one such concept in one or more of the cluster spines appearing within the compass is generated. A plurality of slots in the two-dimensional display positioned circumferentially around the compass is defined. Each label is assigned to the slot outside of the compass for the cluster spine having a closest angularity to the slot.

Still other embodiments of the invention will become readily apparent to those skilled in the art from the following detailed description, wherein are embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

Glossary

Concept: One or more preferably root stem normalized words defining a specific meaning.

Theme: One or more concepts defining a semantic meaning.

Cluster: Grouping of documents containing one or more common themes.

Spine: Grouping of clusters sharing a single concept preferably arranged linearly along a vector. Also referred to as a cluster spine.

Spine Group: Set of connected and semantically-related spines.

Scene: Three-dimensional virtual world space generated from a mapping of an n-dimensional problem space.

Screen: Two-dimensional display space generated from a projection of a scene limited to one single perspective at a time.

The foregoing terms are used throughout this document and, unless indicated otherwise, are assigned the meanings presented above.

System Overview

Figure 1:
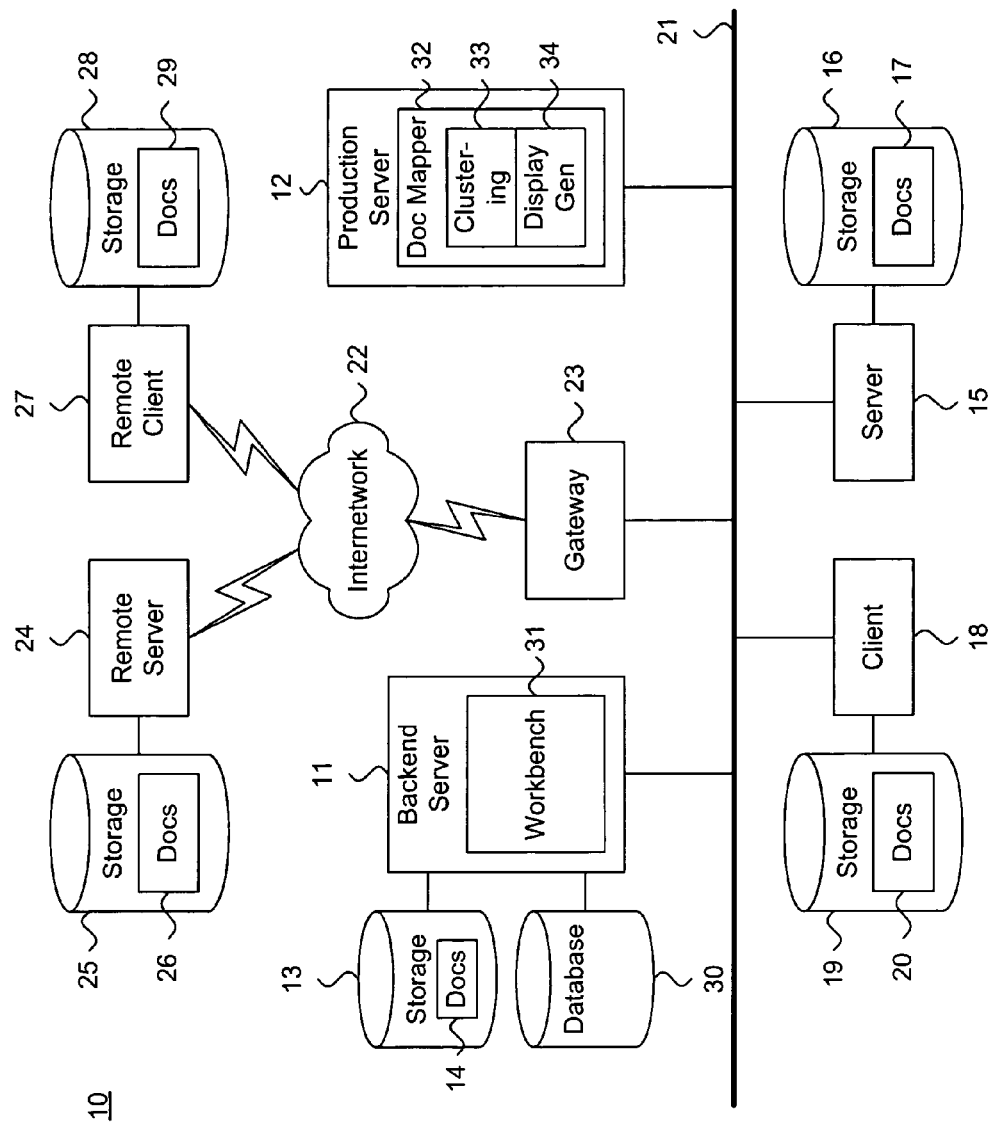
FIG. 1 is a block diagram showing a system for providing a user interface for a dense three-dimensional scene, in accordance with the invention.

FIG. 1 is a block diagram showing a system 10 for providing a user interface for a dense three-dimensional scene, in accordance with the invention. By way of illustration, the system 10 operates in a distributed computing environment, which includes a plurality of heterogeneous systems and document sources. A backend server 11 executes a workbench suite 31 for providing a user interface framework for automated document management, processing and analysis. The backend server 11 is coupled to a storage device 13, which stores documents 14, in the form of structured or unstructured data, and a database 30 for maintaining document information. A production server 12 includes a document mapper 32, that includes a clustering engine 33 and display generator 34. The clustering engine 33 performs efficient document scoring and clustering, such as described in commonly-assigned U.S. patent application Ser. No. 10/626,984, filed Jul. 25, 2003, pending, the disclosure of which is incorporated by reference. The display generator 34 arranges concept clusters in a radial thematic neighborhood relationships projected onto a two-dimensional visual display, such as described in commonly-assigned U.S. Pat. No. 7,191,175, issued Mar. 13, 2007, and U.S. patent application Ser. No. 10/911,375, filed Aug. 3, 2004, pending, the disclosures of which are incorporated by reference. In addition, the display generator 34 provides a user interface for cluster display and navigation, as further described below beginning with reference to FIG. 2.

The document mapper 32 operates on documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the production system 11 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of structured and unstructured data, including electronic message stores, such as word processing documents, electronic mail (email) folders, Web pages, and graphical or multimedia data. Notwithstanding, the documents could be in the form of organized data, such as stored in a spreadsheet or database.

In one embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including backend server 11, production server 32, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Display Generator

Figure 2:
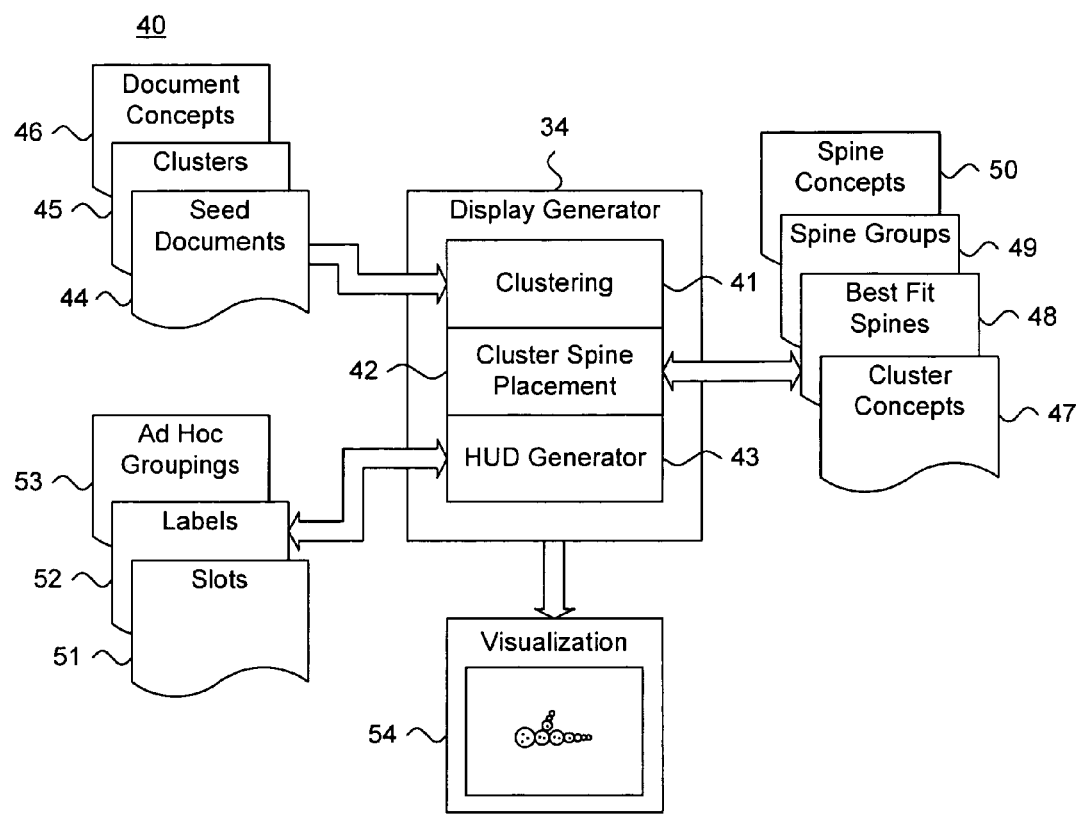
FIG. 2 is a block diagram showing the system modules implementing the display generator of FIG. 1.

FIG. 2 is a block diagram showing the system modules implementing the display generator of FIG. 1. The display generator 34 includes clustering 41, cluster spine placement 42, and HUD 43 components.

Individual documents 14 are analyzed by the clustering component 41 to form clusters 45 of semantically scored documents, such as described in commonly-assigned U.S. patent application Ser. No. 10/626,984, filed Jul. 25, 2003, pending, the disclosure of which is incorporated by reference. In one embodiment, document concepts 46 are formed from concepts and terms extracted from the documents 14 and the frequencies of occurrences and reference counts of the concepts and terms are determined. Each concept and term is then scored based on frequency, concept weight, structural weight, and corpus weight. The document concept scores are compressed and assigned to normalized score vectors for each of the documents 14. The similarities between each of the normalized score vectors are determined, preferably as cosine values. A set of candidate seed documents is evaluated to select a set of seed documents 44 as initial cluster centers based on relative similarity between the assigned normalized score vectors for each of the candidate seed documents or using a dynamic threshold based on an analysis of the similarities of the documents 14 from a center of each cluster 45, such as described in commonly-assigned U.S. patent application Ser. No. 10/626,984, filed Jul. 25, 2003, pending, the disclosure of which is incorporated by reference. The remaining non-seed documents are evaluated against the cluster centers also based on relative similarity and are grouped into the clusters 45 based on best-fit, subject to a minimum fit criterion.

The clustering component 41 analyzes cluster similarities in a multi-dimensional problem space, while the cluster spine placement component 42 maps the clusters into a three-dimensional virtual space that is then projected onto a two-dimensional screen space, as further described below with reference to FIG. 3. The cluster spine placement component 42 evaluates the document concepts 46 assigned to each of the clusters 45 and arranges concept clusters in thematic neighborhood relationships projected onto a shaped two-dimensional visual display, such as described in commonly-assigned U.S. Pat. No. 7,191,175, issued Mar. 13, 2007, and U.S. patent application Ser. No. 10/911,375, filed Aug. 3, 2004, pending, the disclosures of which are incorporated by reference.

During visualization, cluster "spines" and certain clusters 45 are placed as cluster groups 49 within a virtual three-dimensional space as a "scene" or world that is then projected into two-dimensional space as a "screen" or visualization 54. Candidate spines are selected by surveying the cluster concepts 47 for each cluster 45. Each cluster concept 47 shared by two or more clusters 45 can potentially form a spine of clusters 45. However, those cluster concepts 47 referenced by just a single cluster 45 or by more than 10% of the clusters 45 are discarded. Other criteria for discarding cluster concepts 47 are possible. The remaining clusters 45 are identified as candidate spine concepts, which each logically form a candidate spine. Each of the clusters 45 are then assigned to a best fit spine 48 by evaluating the fit of each candidate spine concept to the cluster concept 47. The candidate spine exhibiting a maximum fit is selected as the best fit spine 48 for the cluster 45. Unique seed spines are next selected and placed. Spine concept score vectors are generated for each best fit spine 48 and evaluated. Those best fit spines 48 having an adequate number of assigned clusters 45 and which are sufficiently dissimilar to any previously selected best fit spines 48 are designated and placed as seed spines and the corresponding spine concept 50 is identified. Any remaining unplaced best fit spines 48 and clusters 45 that lack best fit spines 48 are placed into spine groups 49. Anchor clusters are selected based on similarities between unpiaced candidate spines and candidate anchor clusters. Cluster spines are grown by placing the clusters 45 in similarity precedence to previously placed spine clusters or anchor clusters along vectors originating at each anchor cluster. As necessary, clusters 45 are placed outward or in a new vector at a different angle from new anchor clusters 55. The spine groups 49 are placed by translating the spine groups 49 in a radial manner until there is no overlap, such as described in commonly-assigned U.S. Pat. No. 7,271,804, issued Sep. 18, 2007, the disclosure of which is incorporated by reference.

Finally, the HUD generator 43 generates a user interface, which includes a HUD that logically overlays the spine groups 49 placed within the visualization 54 and which provides controls for navigating, exploring and searching the cluster space, as further described below with reference to FIG. 4. The HUD is projected over a potentially complex or dense scene, such as the cluster groups 49 projected from the virtual three-dimensional space, and provides labeling and focusing of select clusters. The HUD includes a compass that provides a focused view of the placed spine groups 49, concept labels that are arranged circumferentially and non-overlappingly around the compass, statistics about the spine groups 49 appearing within the compass, and a garbage can in which to dispose of selected concepts. In one embodiment, the compass is round, although other enclosed shapes and configurations are possible. Labeling is provided by drawing a concept pointer from the outermost cluster in select spine groups 49 as determined in the three-dimensional virtual scene to the periphery of the compass at which the label appears. Preferably, each concept pointer is drawn with a minimum length and placed to avoid overlapping other concept pointers. Focus is provided through a set of zoom, pan and pin controls, as further described below with reference to FIGS. 6A-D.

In one embodiment, a single compass is provided. In a further embodiment, multiple and independent compasses can be provided, as further described below with reference to FIG. 7. A pre-determined number of best fit spines 48 are identified within the three-dimensional virtual scene and labels 52 are assigned based on the number of clusters for each of the projected best fit spines 48 appearing within the compass. A set of wedge-shaped slots 51 are created about the circumference of the compass. The labels are placed into the slots 51 at the end of concept pointers appearing at a minimum distance from the outermost cluster 45 to the periphery of the compass to avoid overlap, as further described below with reference to FIG. 14. In addition, groupings 53 of clusters can be formed by selecting concepts or documents appearing in the compass using the user interface controls.

Each module or component is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The display generator 32 operates in accordance with a sequence of process steps, as further described below with reference to FIG. 11.

Cluster Projection

Figure 3:
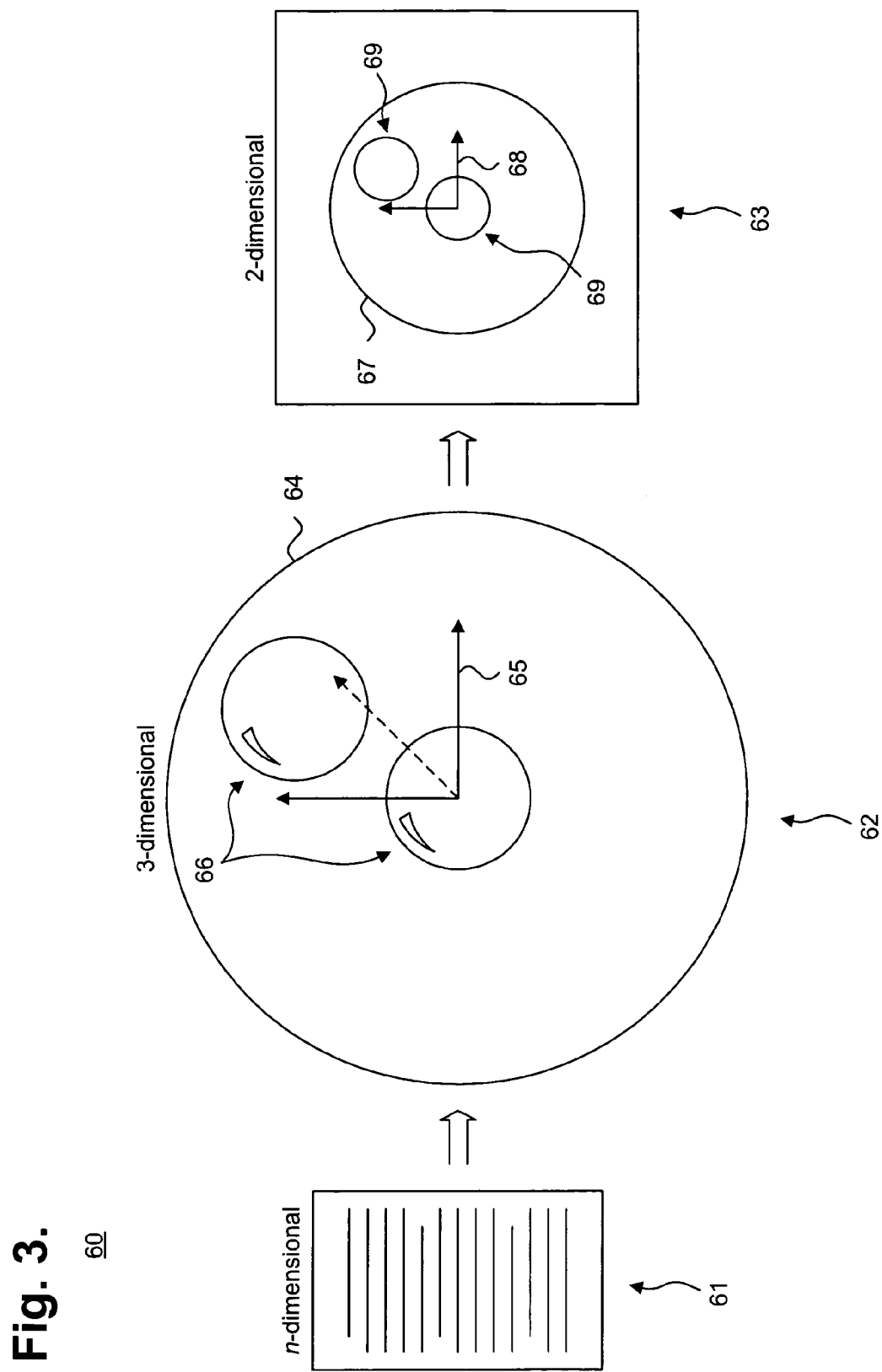
FIG. 3 is a block diagram showing, by way of example, the projection of n-dimensional space into three-dimensional space and two-dimensional space through the display generator of FIG. 1.

FIG. 3 is a block diagram 60 showing, by way of example, the projection of n-dimensional space 61 into three-dimensional space 62 and two-dimensional space 63 through the display generator 34 of FIG. 1. Individual documents 14 form an n-dimensional space 61 with each document concept 46 representing a discrete dimension. From a user's point of view, the n-dimensional space 61 is too abstract and dense to conceptualize into groupings of related document concepts 46 as the number of interrelationships between distinct document concepts 46 increases exponentially with the number of document concepts. Comprehension is quickly lost as concepts increase. Moreover, the n-dimensional space 61 cannot be displayed if n exceeds three dimensions. As a result, the document concept interrelationships are mapped into a three-dimensional virtual "world" and then projected onto a two-dimensional screen.

First, the n-dimensional space 61 is projected into a virtual three-dimensional space 62 by logically group the document concepts 46 into thematically-related clusters 45. In one embodiment, the three-dimensional space 62 is conceptualized into a virtual world or "scene" that represents each cluster 45 as a virtual sphere 66 placed relative to other thematically-related clusters 45, although other shapes are possible. Importantly, the three-dimensional space 62 is not displayed, but is used instead to generate a screen view. The three-dimensional space 62 is projected from a predefined perspective onto a two-dimensional space 63 by representing each cluster 45 as a circle 69, although other shapes are possible.

Although the three-dimensional space 62 could be displayed through a series of two-dimensional projections that would simulate navigation through the three-dimensional space through yawing, pitching and rolling, comprehension would quickly be lost as the orientation of the clusters 45 changed. Accordingly, the screens generated in the two-dimensional space 63 are limited to one single perspective at a time, such as would be seen by a viewer looking at the three-dimensional space 62 from a stationary vantage point, but the vantage point can be moved. The viewer is able to navigate through the two-dimensional space 63 through zooming and panning. Through the HUD, the user is allowed to zoom and pan through the clusters 45 appearing within compass 67 and pin select document concepts 46 into place onto the compass 67. During panning and zooming, the absolute three-dimensional coordinates 65 of each cluster 45 within the three-dimensional space 64 remain unchanged, while the relative two-dimensional coordinates 68 are updated as the view through the HUD is modified. Finally, spine labels are generated for the thematic concepts of cluster spines appearing within the compass 67 based on the underlying scene in the three-dimensional space 64 and perspective of the viewer, as further described below with reference to FIG. 14.

User Interface Example

Figure 4:
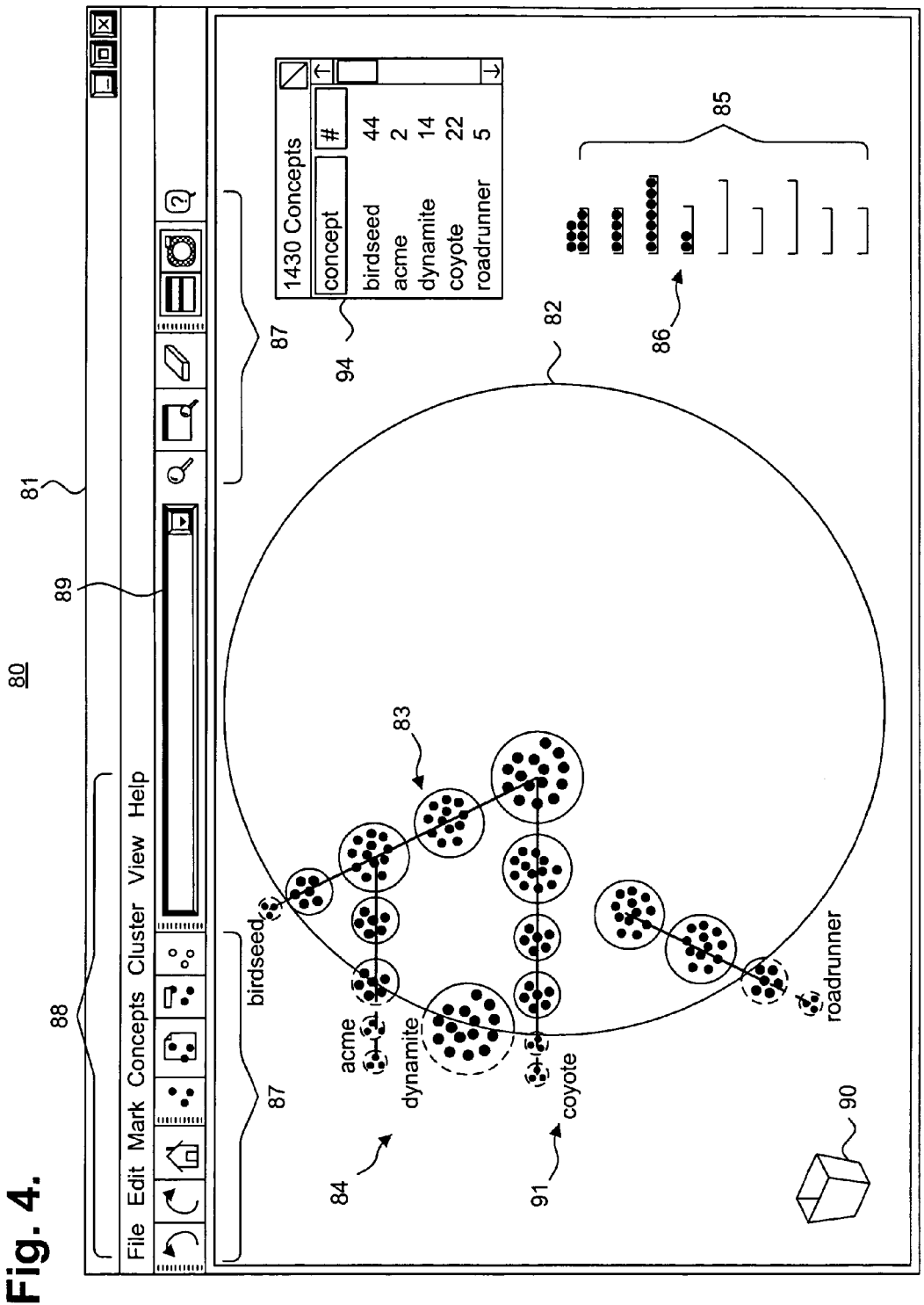
FIG. 4 is a screen display diagram showing, by way of example, a user interface generated by the display generator of FIG. 1.

FIG. 4 is a screen display diagram 80 showing, by way of example, a user interface 81 generated by the display generator 34 of FIG. 1. The user interface 81 includes the controls and HUD. Cluster data is placed within the user interface 81. The controls and HUD enable a user to navigate, explore and search the cluster data 83 appearing within a compass 82, as further described below with reference to FIG. 5. The cluster data 84 appearing outside of the compass 82 is navigable until the compass is zoomed or panned over that cluster data 84. In a further embodiment, multiple and independent compasses 82 can be included in disjunctive, overlapping or concentric configurations. Other shapes and configurations of compasses are possible.

In one embodiment, the controls are provided by a combination of mouse button and keyboard shortcut assignments, which control the orientation, zoom, pan, and selection of placed clusters 83 within the compass 82, and toolbar buttons 87 provided on the user interface 81. By way of example, the mouse buttons enable the user to zoom and pan around and pin down the placed clusters 83. For instance, by holding the middle mouse button and dragging the mouse, the placed clusters 83 appearing within the compass 82 can be panned. Similarly, by rolling a wheel on the mouse, the placed clusters 83 appearing within the compass 82 can be zoomed inwards to or outwards from the location at which the mouse cursor points. Finally, by pressing a Home toolbar button or keyboard shortcut, the placed clusters 83 appearing within the compass 82 can be returned to an initial view centered on the display screen. Keyboard shortcuts can provide similar functionality as the mouse buttons.

Individual spine concepts 50 can be "pinned" in place on the circumference of the compass 82 by clicking the left mouse button on a cluster spine label 91. The spine label 91 appearing at the end of the concept pointer connecting the outermost cluster of placed clusters 83 associated with the pinned spine concept 50 are highlighted. Pinning fixes a spine label 91 to the compass 82, which causes the spine label 91 to remain fixed to the same place on the compass 82 independent of the location of the associated placed clusters 83 and adds weight to the associated cluster 83 during reclustering.

The toolbar buttons 87 enable a user to execute specific commands for the composition of the spine groups 49 displayed. By way of example, the toolbar buttons 87 provide the following functions:

(1) Select a previous document 14 in a cluster spiral;
(2) Select a next document 14 in a cluster spiral;
(3) Return to home view;
(4) Re-cluster documents 14;
(5) Select a document 14 and cluster the remaining documents 14 based on similarity in concepts to the document concepts 46 of the selected document 14;
(6) Select one or more cluster concepts 47 and cluster the documents 14 containing those selected concepts separately from the remaining documents 14;
(7) Re-cluster all highlighted documents 14 separately from the remaining documents 14;
(8) Quickly search for words or phrases that may not appear in the concept list 94, which is specified through a text dialogue box 89;
(9) Perform an advanced search based on, for instance, search terms, natural language or Boolean searching, specified files or file types, text only, including word variations, and metadata fields;
(10) Clear all currently selected concepts and documents highlighted;
(11) Display a document viewer;
(12) Disable the compass; and
(13) Provide help.

In addition, a set of pull down menus 88 provide further control over the placement and manipulation of clusters within the user interface 81. Other types of controls and functions are possible.

Visually, the compass 82 emphasizes visible placed clusters 83 and deemphasizes placed clusters 84 appearing outside of the compass 82. The view of the cluster spines appearing within the focus area of the compass 82 can be zoomed and panned and the compass 82 can also be resized and disabled. In one embodiment, the placed clusters 83 appearing within the compass 82 are displayed at full brightness, while the placed clusters 84 appearing outside the compass 82 are displayed at 30 percent of original brightness, although other levels of brightness or visual accent, including various combinations of color, line width and so forth, are possible. Spine labels 91 appear at the ends of concept pointers connecting the outermost cluster of select placed clusters 83 to preferably the closest point along the periphery of the compass 82. In one embodiment, the spine labels 91 are placed without overlap and circumferentially around the compass 82, as further described below with reference to FIG. 14. The spine labels 91 correspond to the cluster concepts 47 that most describe the spine groups 49 appearing within the compass 82. Additionally, the cluster concepts 47 for each of the spine labels 91 appear in a concepts list 94.

In one embodiment, a set of set-aside trays 85 are provided to graphically group those documents 86 that have been selected or logically marked into sorting categories. In addition, a garbage can 90 is provided to remove cluster concepts 47 from consideration in the current set of placed spine groups 49. Removed cluster concepts 47 prevent those concepts from affecting future clustering, as may occur when a user considers a concept irrelevant to the placed clusters 84.

User Interface

Figure 5:
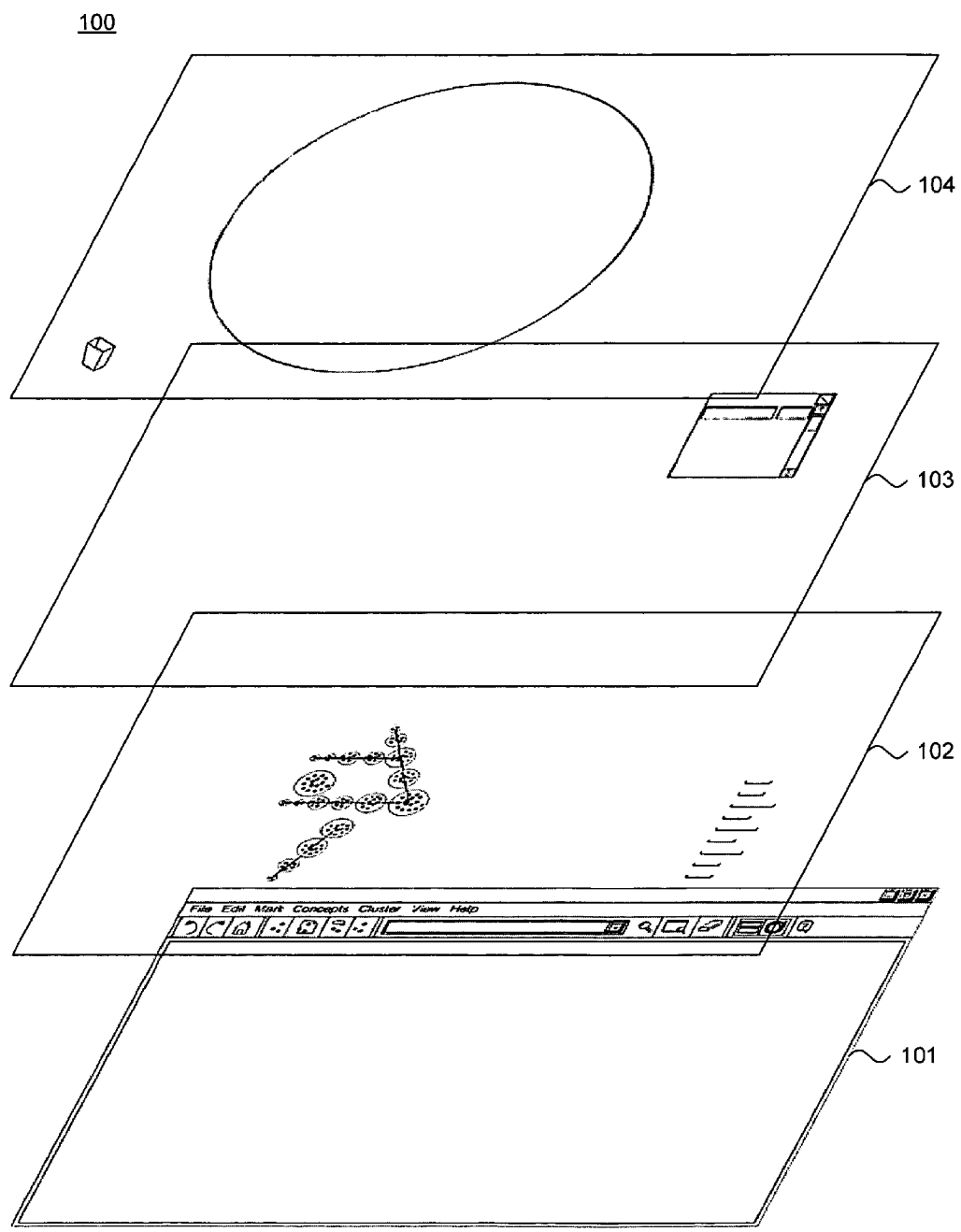
FIG. 5 is an exploded screen display diagram showing the user interface of FIG. 4.

FIG. 5 is an exploded screen display diagram 100 showing the user interface 81 of FIG. 4. The user interface 81 includes controls 101, concepts list 103 and HUD 104. Clusters 102 are presented to the user for viewing and manipulation via the controls 101, concepts list 103 and HUD 104. The controls 101 enable a user to navigate, explore and search the cluster space through the mouse buttons, keyboard and toolbar buttons 87. The concepts list 103 identifies a total number of concepts and lists each concept and the number of occurrences. Concepts can be selected from the concepts list 103. Lastly, the HUD 104 creates a visual illusion that draws the users' attention to the compass 82 without actually effecting the composition of the clusters 102.

User Interface Controls Examples

FIGS. 6A-D are data representation diagrams 120, 130, 140, 150 showing, by way of examples, display zooming, panning and pinning using the user interface 81 of FIG. 4. Using the controls, a user can zoom and pan within the HUD and can pin spine concepts 50, as denoted by the spine labels for placed clusters 83. Zooming increases or decreases the amount of the detail of the placed clusters 83 within the HUD, while panning shifts the relative locations of the placed clusters 83 within the HUD. Other types of user controls are possible.

Figure 6A:
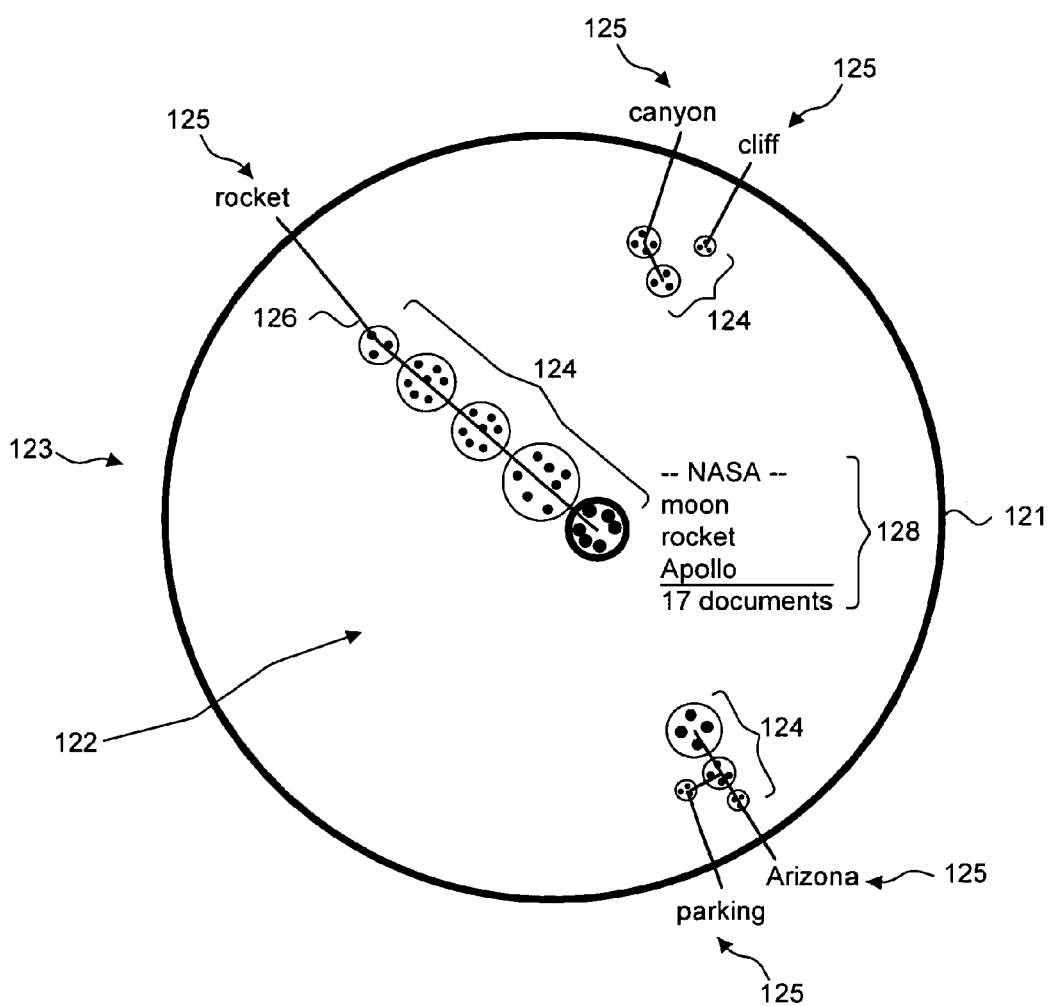
FIGS. 6A-D are data representation diagrams showing, by way of examples, display zooming, panning and pinning using the user interface of FIG. 4.

Referring first to FIG. 6A, a compass 121 frames a set of cluster spines 124. The compass 121 logically separates the cluster spines 124 into a "focused" area 122, that is, those cluster spines 124 appearing inside of the compass 121, and an "unfocused" area 123, that is, the remaining cluster spines 124 appearing outside of the compass 121.

In one embodiment, the unfocused area 123 appears under a visual "velum" created by decreasing the brightness of the placed cluster spines 124 outside the compass 121 by 30 percent, although other levels of brightness or visual accent, including various combinations of color, line width and so forth, are possible. The placed cluster spines 124 inside of the focused area 122 are identified by spine labels 125, which are placed into logical "slots" at the end of concept pointers 126 that associate each spine label 125 with the corresponding placed cluster spine 124. The spine labels 125 show the common concept 46 that connects the clusters 83 appearing in the associated placed cluster spine 124. Each concept pointer 126 connects the outermost cluster 45 of the associated placed cluster spine 124 to the periphery of the compass 121 centered in the logical slot for the spine label 125. Concept pointers 126 are highlighted in the HUD when a concept 46 within the placed cluster spine 124 is selected or a pointer, such as a mouse cursor, is held over the concept 46. Each cluster 83 also has a cluster label 128 that appears when the pointer is used to select a particular cluster 83 in the HUD. The cluster label 128 shows the top concepts 46 that brought the documents 14 together as the cluster 83, plus the total number of documents 14 for that cluster 83.

In one embodiment, spine labels 125 are placed to minimize the length of the concept pointers 126. Each spine label 125 is optimally situated to avoid overlap with other spine labels 125 and crossing of other concept pointers 126, as further described below with reference to FIG. 14. In addition, spine labels 125 are provided for only up to a predefined number of placed cluster spines 124 to prevent the compass 121 from becoming too visually cluttered and to allow the user to retrieve extra data, if desired. The user also can change the number of spine labels 125 shown in the compass 121.

Figure 6B:
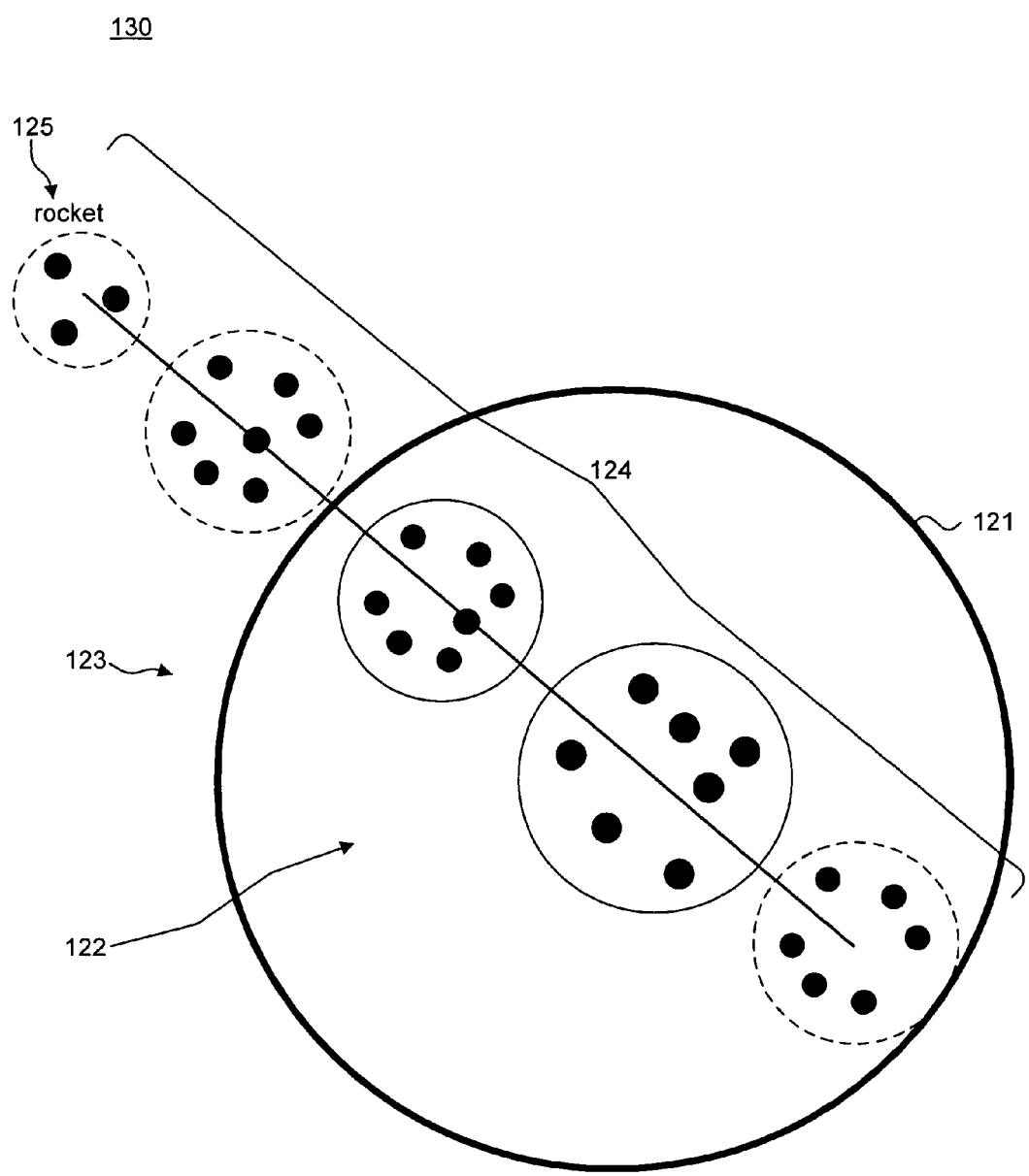

Referring next to FIG. 6B, the placed cluster spines 124 as originally framed by the compass 121 have been zoomed inwards. When zoomed inwards, the placed cluster spines 124 appearing within the compass 121 nearest to the pointer appear larger. In addition, those placed cluster spines 124 originally appearing within the focused area 122 that are closer to the inside edge of the compass 121 are shifted into the unfocused area 123. Conversely, when zoomed outwards, the placed cluster spines 124 appearing within the compass 121 nearest to the pointer appear smaller. Similarly, those placed cluster spines 124 originally appearing within the unfocused area 123 that are closer to the outside edge of the compass 121 are shifted into the focused area 122.

In one embodiment, the compass 121 zooms towards or away from the location of the pointer, rather than the middle of the compass 121. Additionally, the speed at which the placed cluster spines 124 within the focused area 122 changes can be varied. For instance, variable zooming can move the compass 121 at a faster pace proportionate to the distance to the placed cluster spines 124 being viewed. Thus, a close-up view of the placed cluster spines 124 zooms more slowly than a far away view. Finally, the spine labels 125 become more specific with respect to the placed cluster spines 124 appearing within the compass 121 as the zooming changes. High level details are displayed through the spine labels 125 when the compass 121 is zoomed outwards and low level details are displayed through the spine labels 125 when the compass 121 is zoomed inwards. Other zooming controls and orientations are possible.

Figure 6C:
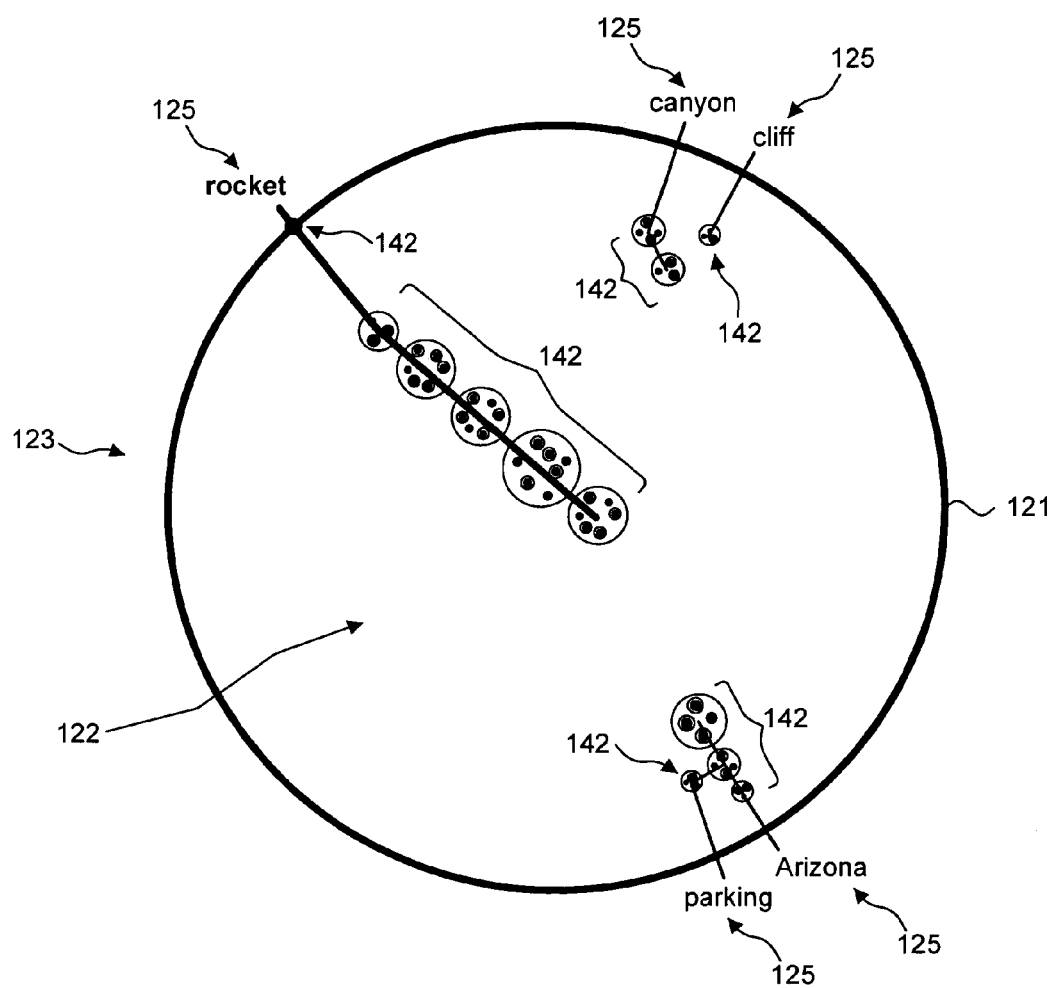

Referring next to FIG. 6C, the placed cluster spines 124 as originally framed by the compass 121 have been zoomed back outwards and a spine label 125 has been pinned to fixed location on the compass 121. Ordinarily, during zooming and panning, the spine labels 125 associated with the placed cluster spines 124 that remain within the compass 121 are redrawn to optimally situate each spine label 125 to avoid overlap with other spine labels 125 and the crossing of other concept pointers 126 independent of the zoom level and panning direction. However, one or more spine labels 125 can be pinned by fixing the location 141 of the spine label 125 along the compass 121 using the pointer. Subsequently, each pinned spine label 125 remains fixed in-place, while the associated placed cluster spine 124 is reoriented within the compass 121 by the zooming or panning. When pinned, each cluster 142 corresponding to the pinned spine label 125 is highlighted. Finally, highlighted spine labels 125 are dimmed during panning or zooming.

Figure 6D:
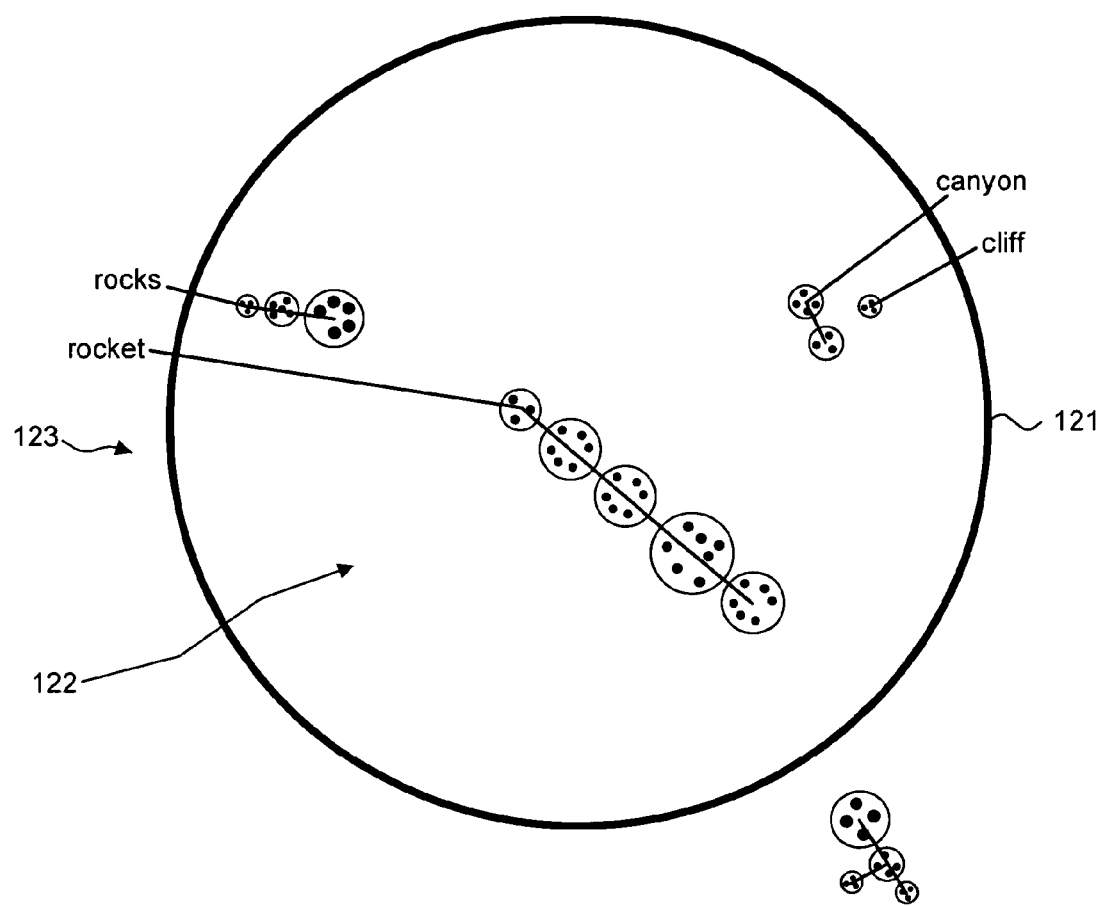

Referring lastly to FIG. 6D, the compass 121 has been panned down and to the right. When panned, the placed cluster spines 124 appearing within the compass 121 shift in the direction of the panning motion. Those placed cluster spines 124 originally appearing within the focused area 122 that are closer to the edge of the compass 121 away from the panning motion are shifted into the unfocused area 123 while those placed cluster spines 124 originally appearing within the unfocused area 123 that are closer to the outside edge of the compass 121 towards the panning motion are shifted into the focused area 122. In one embodiment, the compass 121 pans in the same direction as the pointer is moved. Other panning orientations are possible.

Example Multiple Compasses

Figure 7:
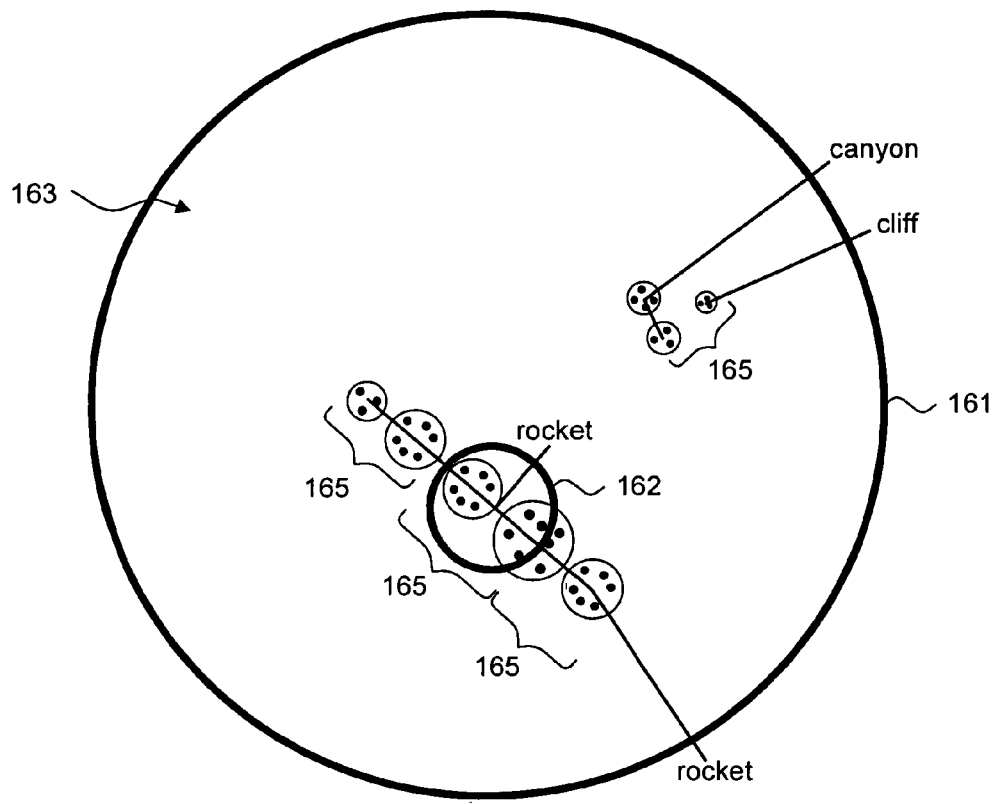
FIG. 7 is a data representation diagram showing, by way of example, multiple compasses generated using the user interface of FIG. 4.

FIG. 7 is a data representation diagram 160 showing, by way of example, multiple compasses 161, 162 generated using the user interface 81 of FIG. 4. Each compass 161, 162 operates independently from any other compass and multiple compasses can 161, 162 be placed in disjunctive, overlapping or concentric configurations to allow the user to emphasize different aspects of the placed cluster spines 124 without panning or zooming. Spine labels for placed cluster spines are generated based on the respective focus of each compass 161, 162. Thus, the placed cluster spines 166 appearing within the focused area of an inner compass 162 situated concentric to an outer compass 161 result in one set of spine labels, while those placed cluster spines 165 appearing within the focused area of the outer compass 161 result in another set of spine labels, which may be different that the inner compass spine labels set. In addition, each compass 161, 162 can be independently resized. Other controls, arrangements and orientations of compasses are possible.

Example Single and Multiple Compasses

Figure 8A:
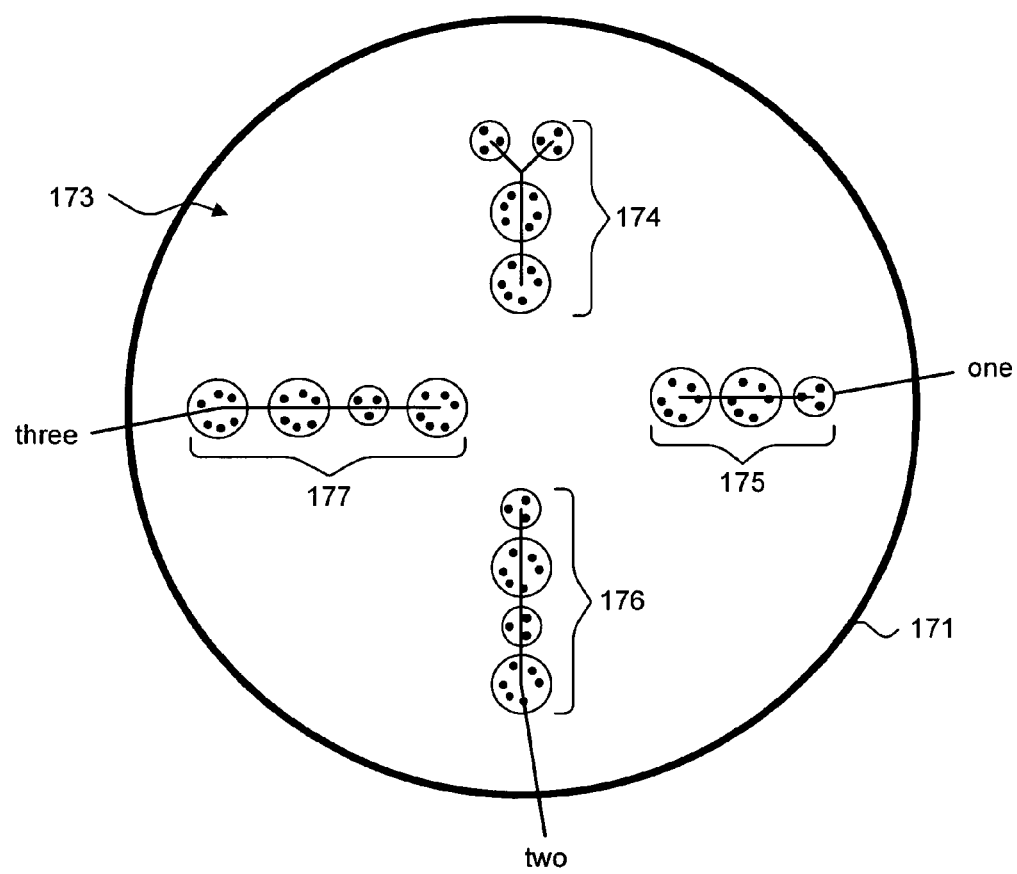
FIGS. 8A-C are data representation diagrams showing, by way of example, single and multiple compasses generated using the user interface of FIG. 4.
Figure 8B:
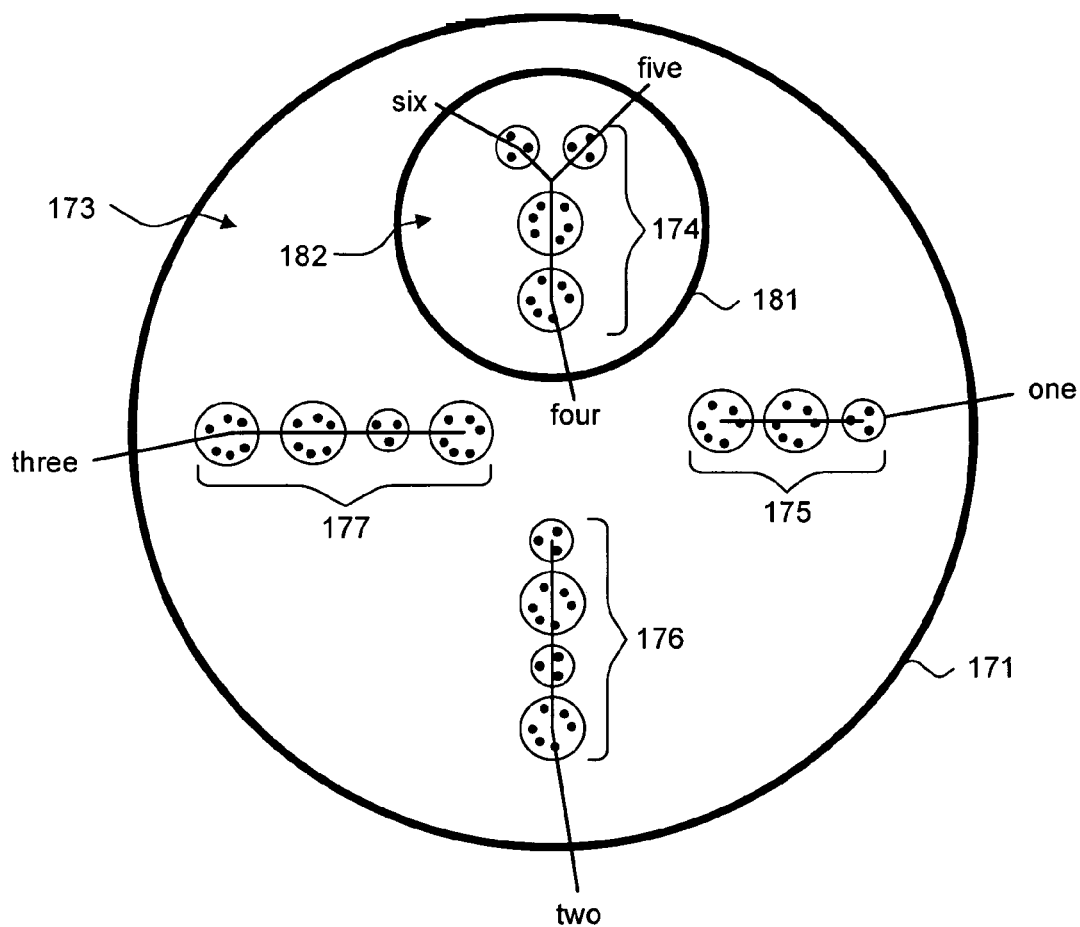
Figure 8C:
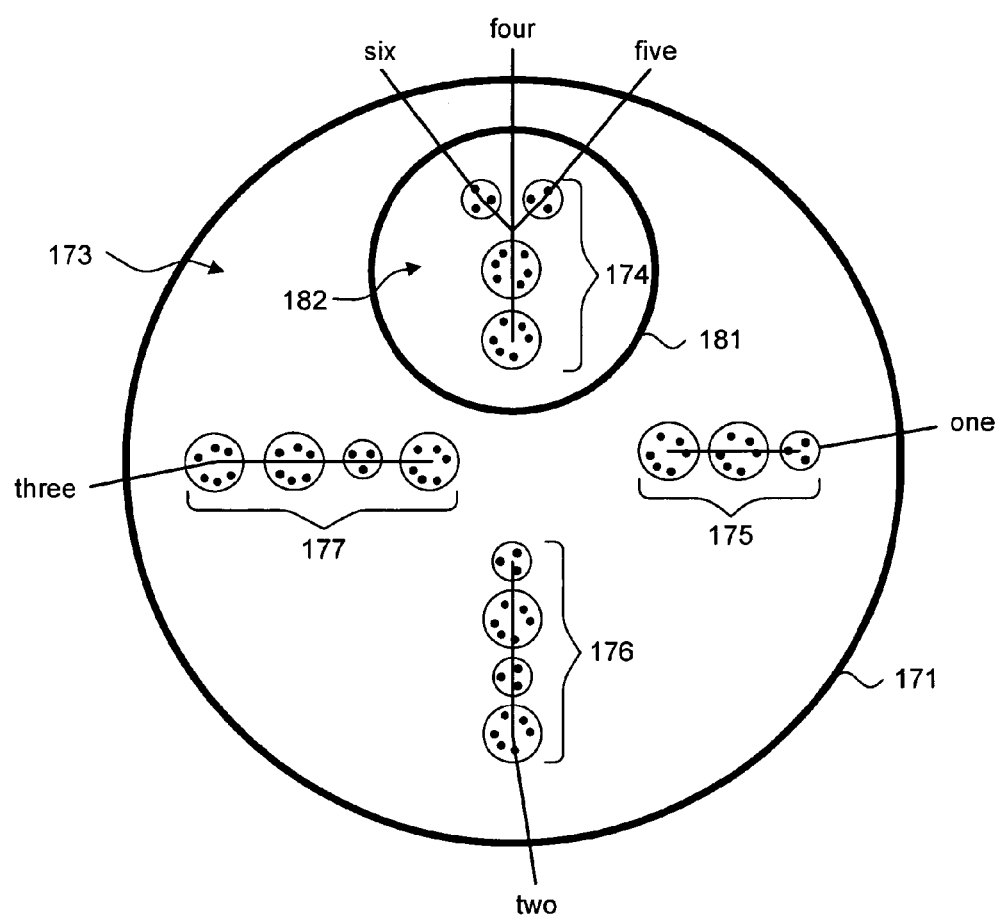

FIGS. 8A-C are data representation diagrams 170, 180, 190 showing, by way of example, single 171 and multiple compasses 171, 181 generated using the user interface of FIG. 4. Multiple compasses can be used to show concepts through spine labels concerning those cluster spines appearing within their focus, whereas spine labels for those same concepts may not be otherwise generated. Referring first to FIG. 8A, an outer compass 171 frames four sets of cluster spines 174, 175, 176, 177. Spine labels for only three of the placed cluster spines 175, 176, 177 in the "focused" area 173 are generated and placed along the outer circumference of the outer compass 171. Referring next to FIG. 8B, an inner compass 181 frames the set of cluster spines 174. Spine labels for the placed cluster spines 174 in the "focused" area 182 are generated and placed along the outer circumference of the inner compass 181, even though these spine same labels were not generated and placed along the outer circumference of the outer compass 171. Referring lastly to FIG. 8C, in a further embodiment, spine labels for the placed cluster spines in the "focused" area 172 are generated and placed along the outer circumference of the original outer compass 171. The additional spine labels have no effect on the focus of the outer compass 171. Other controls, arrangements and orientations of compasses are possible.

Example Cluster Spine Group

Figure 9:
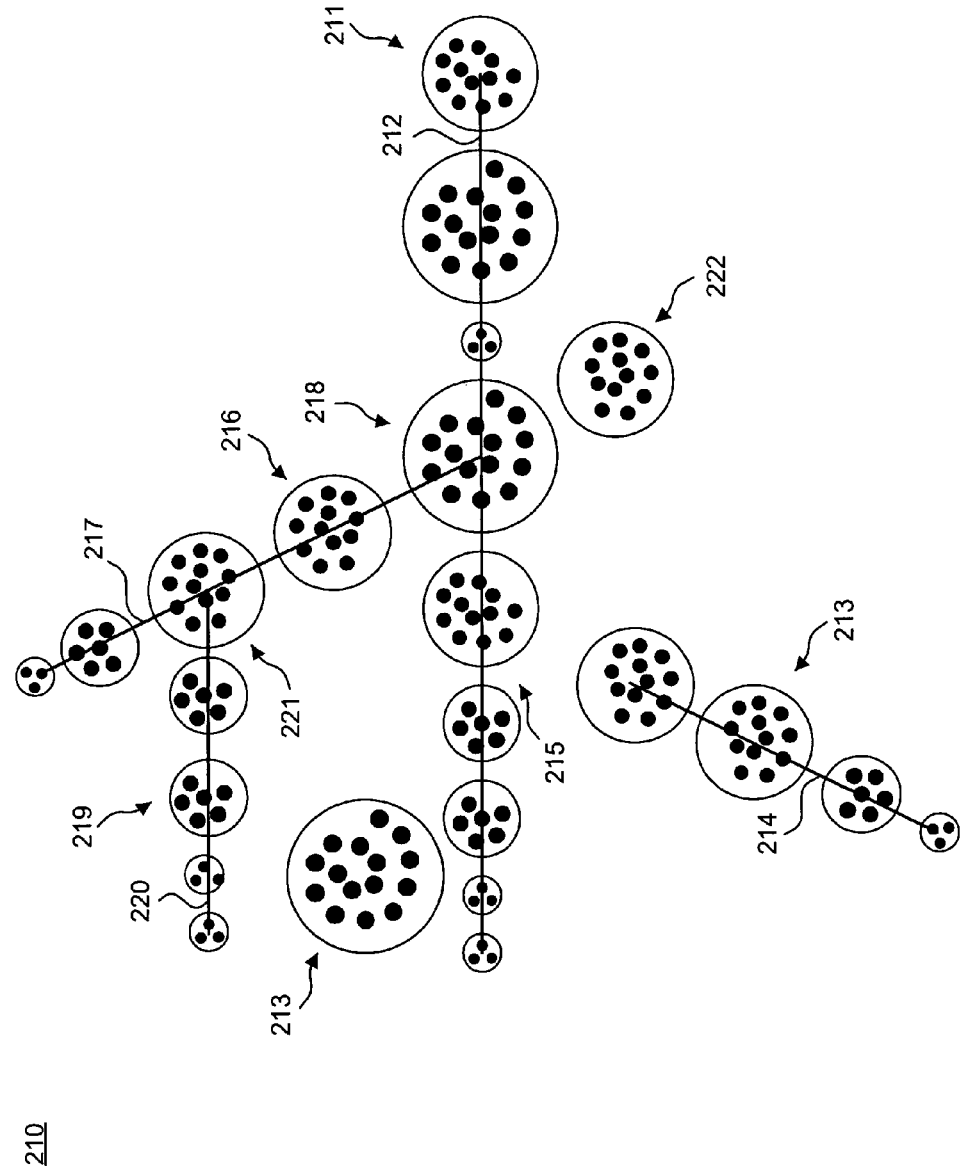
FIG. 9 is a data representation diagram showing, by way of example, a cluster spine group.

FIG. 9 is a data representation diagram 210 showing, by way of example, a cluster spine group 49. One or more cluster spine groups 49 are presented. In one embodiment, the cluster spine groups 49 are placed in a circular arrangement centered initially in the compass 82, as further described below with reference to FIG. 10. A set of individual best fit spines 211, 213, 216, 219 are created by assigning clusters 45 sharing a common best fit theme. The best fit spines are ordered based on spine length and the longest best fit spine 121 is selected as an initial unique seed spine. Each of the unplaced remaining best fit spines 213, 216, 219 are grafted onto the placed best fit spine 211 by first building a candidate anchor cluster list. If possible, each remaining best fit spine 216, 219 is placed at an anchor cluster 218, 221 on the best fit spine that is the most similar to the unplaced best fit spine. The best fit spines 211, 216, 219 are placed along a vector 212, 217, 219 with a connecting line drawn in the visualization 54 to indicate relatedness. Otherwise, each remaining best fit spine 213 is placed at a weak anchor 215 with a connecting line 214 drawn in the visualization 54 to indicate relatedness. However, the connecting line 214 does not connect to the weak anchor 215. Relatedness is indicated by proximity only.

Next, each of the unplaced remaining singleton clusters 222 are loosely grafted onto a placed best fit spine 211, 216, 219 by first building a candidate anchor cluster list. Each of the remaining singleton clusters 222 are placed proximal to an anchor cluster that is most similar to the singleton cluster. The singleton clusters 222 are placed along a vector 212, 217, 219, but no connecting line is drawn in the visualization 54. Relatedness is indicated by proximity only.

Cluster Spine Group Placement Example

Figure 10:
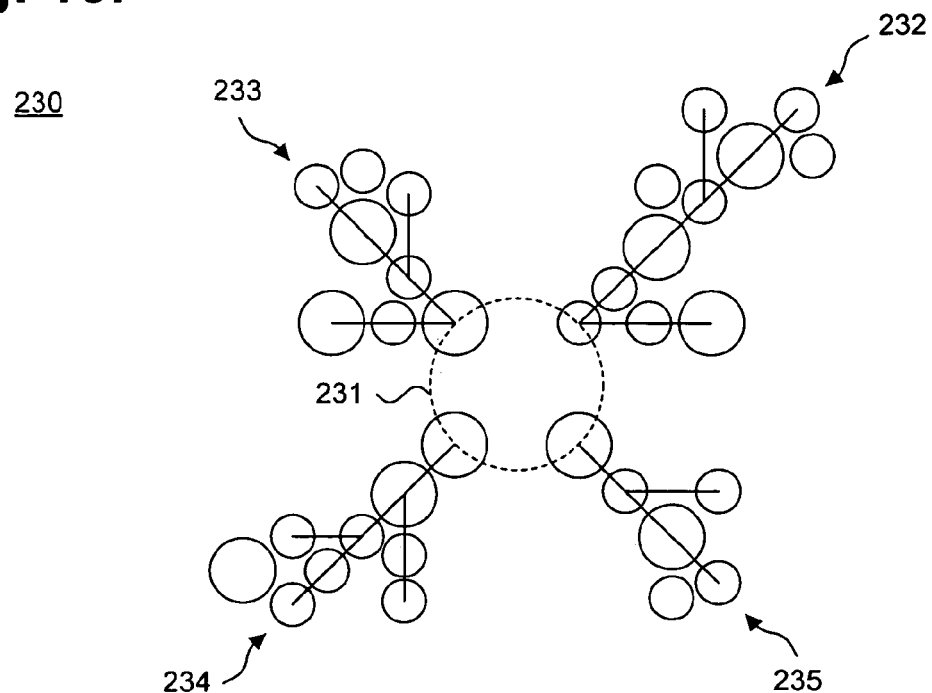
FIG. 10 is a data representation diagram showing, by way of examples, cluster spine group placements.

FIG. 10 is a data representation diagram 230 showing, by way of examples, cluster spine group placements. A set of seed cluster spine groups 232-235 are shown evenly-spaced circumferentially to an innermost circle 231. No clusters 80 assigned to each seed cluster spine group frame a sector within which the corresponding seed cluster spine group is placed.

Cluster Spine Group Overlap Removal Example

Figure 11:
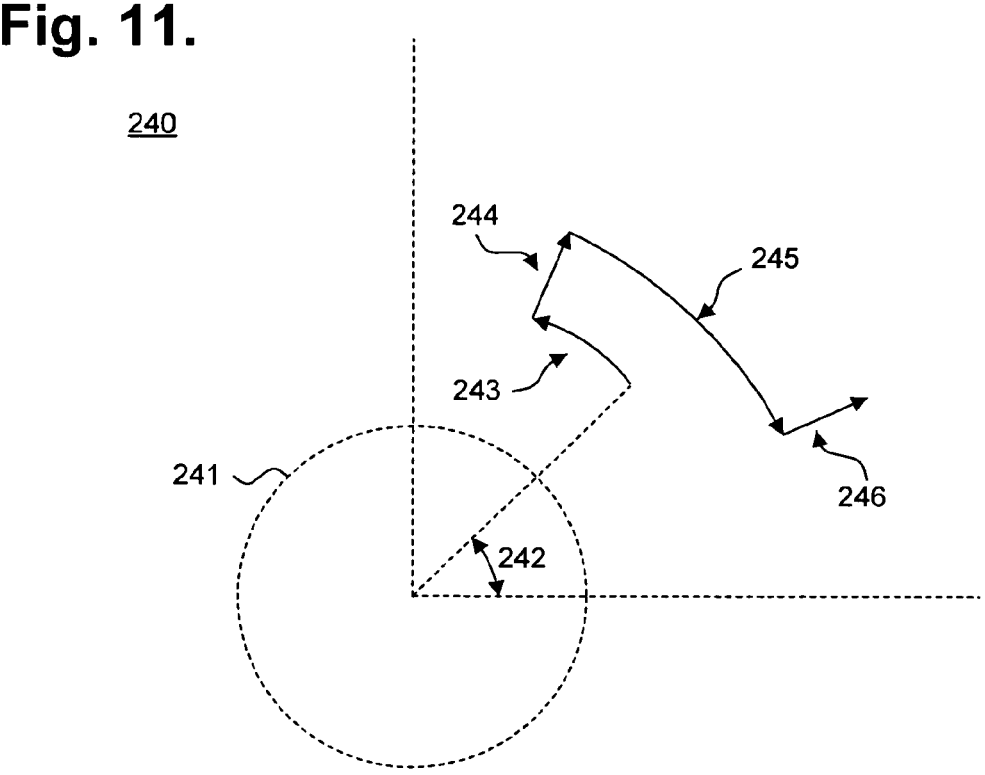
FIG. 11 is a data representation diagram showing, by way of example, cluster spine group overlap removal.

FIG. 11 is a data representation diagram 240 showing, by way of example, cluster spine group overlap removal. An overlapping cluster spine group is first rotated in an anti-clockwise direction 243 up to a maximum angle and, if still overlapping, translated in an outwards direction 244. Rotation 245 and outward translation 246 are repeated until the overlap is resolved. The rotation can be in any direction and amount of outward translation any distance.

Method Overview

Figure 12:
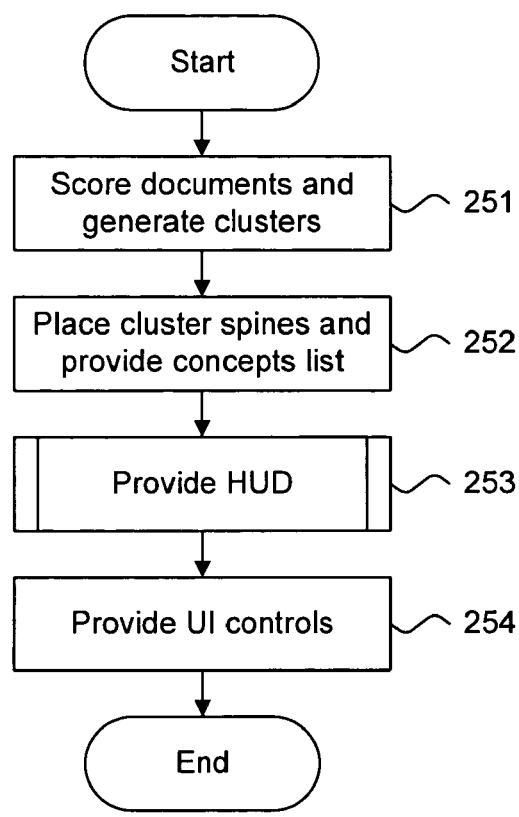
FIG. 12 is a flow diagram showing a method for providing a user interface for a dense three-dimensional scene, in accordance with the invention.

FIG. 12 is a flow diagram showing a method 250 for providing a user interface 81 for a dense three-dimensional scene, in accordance with the invention. The method 250 is described as a sequence of process operations or steps, which can be executed, for instance, by a displayed generator 34 (shown in FIG. 1).

As an initial step, documents 14 are scored and clusters 45 are generated (block 251), such as described in commonly-assigned U.S. patent application Ser. No. 10/626,984, filed Jul. 25, 2003, pending, the disclosure of which is incorporated by reference. Next, clusters spines are placed as cluster groups 49 (block 252), such as described in commonly-assigned U.S. Patent No. 7,191,175, issued Mar. 13, 2007, and U.S. patent application Ser. No. 10/911,375, filed Aug. 3, 2004, pending, the disclosures of which are incorporated by reference, and the concepts list 103 is provided. The HUD 104 is provided (block 253) to provide a focused view of the clusters 102, as further described below with reference to FIG. 13. Finally, controls are provided through the user interface 81 for navigating, exploring and searching the cluster space (block 254). The method then terminates.

HUD Generation

Figure 13:
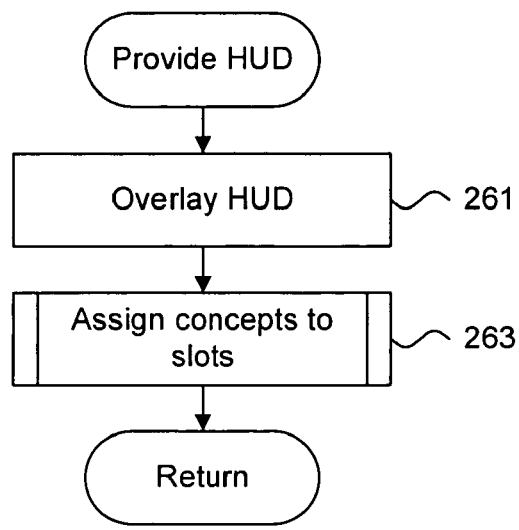
FIG. 13 is a flow diagram showing the routine for providing a HUD for use in the method of FIG. 12.

FIG. 13 is a flow diagram showing the routine 260 for providing a HUD for use in the method 250 of FIG. 12. One purpose of this routine is to generate the visual overlay, including the compass 82, that defines the HUD.

Initially, the compass 82 is generated to overlay the placed clusters layer 102 (block 261). In a further embodiment, the compass 82 can be disabled. Next, cluster concepts 47 are assigned into the slots 51 (block 262), as further described below with reference to FIG. 14. Following cluster concept 47 assignment, the routine returns.

Concept Assignment to Slots

Figure 14:
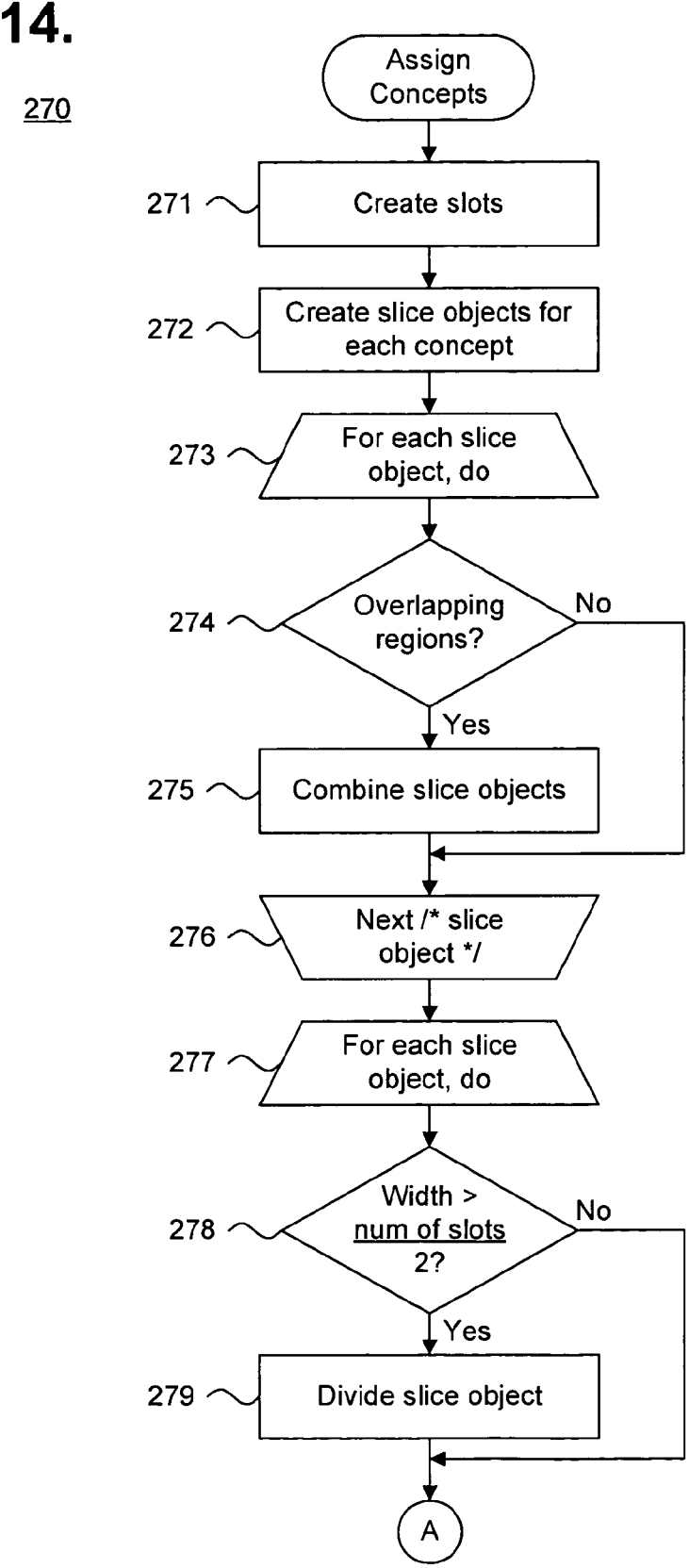
FIG. 14 is a flow diagram showing the routine for assigning clusters to slots for use in the routine of FIG. 13.
Figure 14:
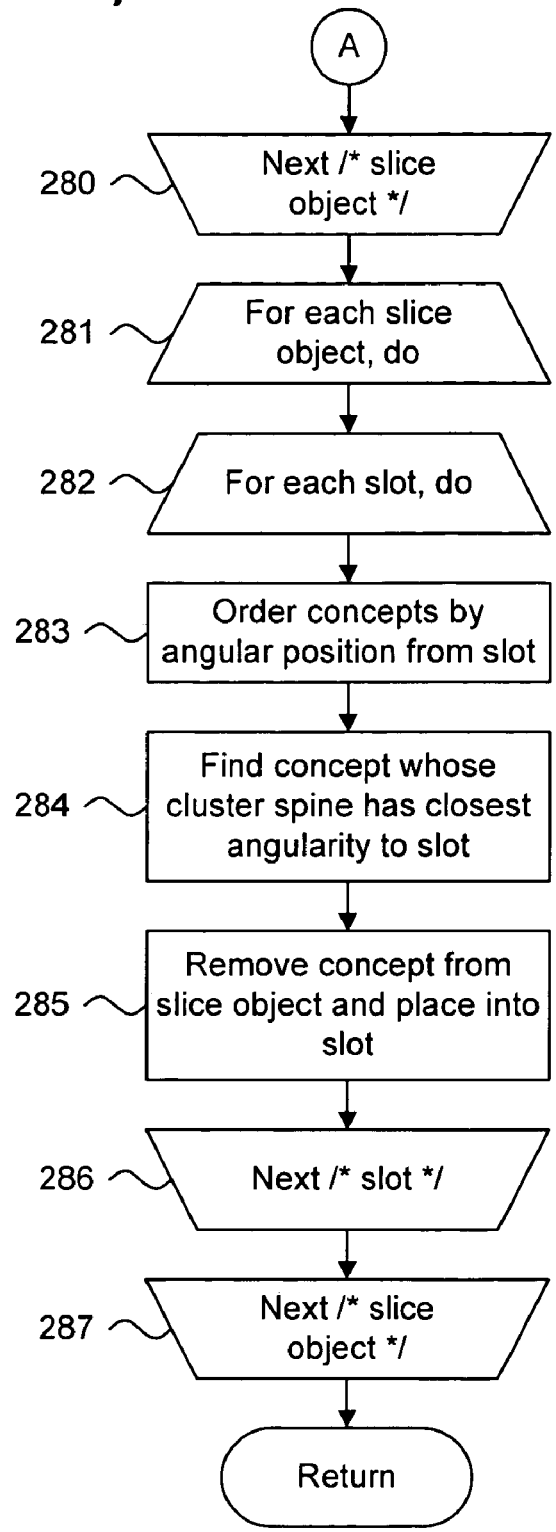

FIG. 14 is a flow diagram showing the routine 270 for assigning concepts 47 to slots 51 for use in the routine 260 of FIG. 13. One purpose of this routine is to choose the locations of the spine labels 91 based on the placed clusters 83 appearing within the compass 82 and available slots 51 to avoid overlap and crossed concept pointers.

Initially, a set of slots 51 is created (block 271). The slots 51 are determined circumferentially defined around the compass 82 to avoid crossing of navigation concept pointers and overlap between individual spine labels 91 when projected into two dimensions. In one embodiment, the slots 51 are determined based on the three-dimensional Cartesian coordinates 65 (shown in FIG. 3) of the outermost cluster in select spine groups 49 and the perspective of the user in viewing the three-dimensional space 62. As the size of the compass 82 changes, the number and position of the slots 51 change. If there are fewer slots available to display the cluster concepts 47 selected by the user, only the number of cluster concepts 47 that will fit in the slots 51 available will be displayed.

Next, a set of slice objects is created for each cluster concept 47 that occurs in a placed cluster 83 appearing within the compass 82 (block 272). Each slice object defines an angular region of the compass 82 and holds the cluster concepts 47 that will appear within that region, the center slot 51 of that region, and the width of the slice object, specified in number of slots 51. In addition, in one embodiment, each slice object is interactive and, when associated with a spine label 91, can be selected with a mouse cursor to cause each of the cluster concepts 47 in the display to be selected and highlighted. Next, framing slice objects are identified by iteratively processing each of the slice objects (blocks 273-276), as follows. For each slice object, if the slice object defines a region that frames another slice object (block 274), the slice objects are combined (block 275) by changing the center slot 51, increasing the width of the slice object, and combining the cluster concepts 47 into a single slice object. Next, those slice objects having a width of more than half of the number of slots 51 are divided by iteratively processing each of the slice objects (block 277-280), as follows. For each slice object, if the width of the slice object exceeds the number of slots divided by two (block 278), the slice object is divided (block 279) to eliminate unwanted crossings of lines that connect spine labels 91 to associated placed clusters 83. Lastly, the cluster concepts 47 are assigned to slots 51 by a set of nested processing loops for each of the slice objects (blocks 281-287) and slots 51 (blocks 282-286), as follows. For each slot 51 appearing in each slice object, the cluster concepts 47 are ordered by angular position from the slot 51 (block 283), as further described below with reference to FIG. 13. The cluster concept 47 whose corresponding cluster spine has the closest angularity to the slot 51 is selected (block 284). The cluster concept 47 is removed from the slice object and placed into the slot 51 (block 285), which will then be displayed within the HUD layer 103 as a spine label 91. Upon the completion of cluster concept 47 assignments, the routine returns.

Cluster Assignment Example

Figure 15:
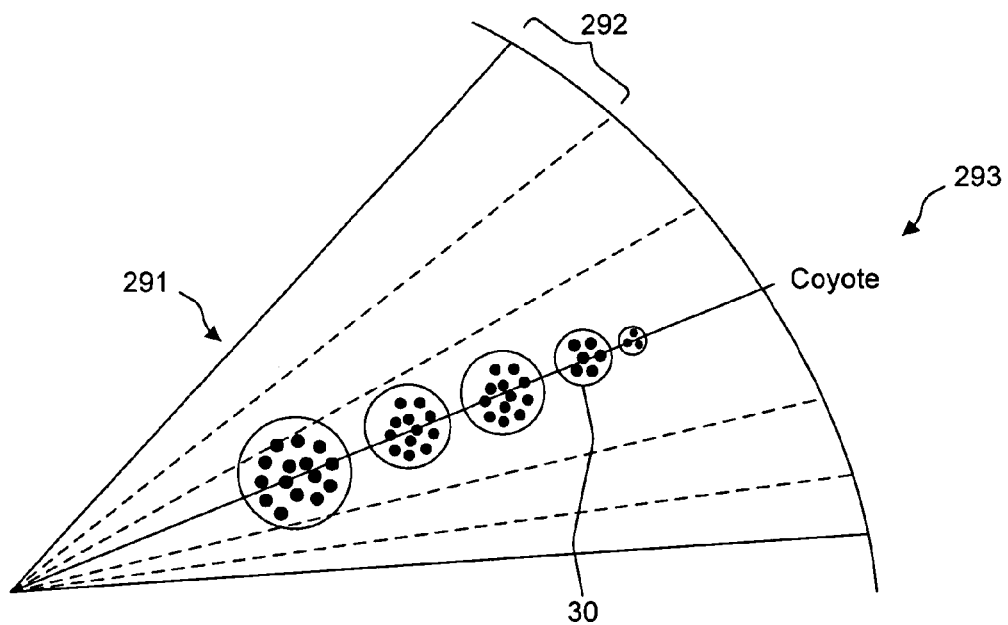
FIG. 15 is a data representation diagram showing, by way of example, a cluster assignment to a slot within a slice object.

FIG. 15 is a data representation diagram 290 showing, by way of example, a cluster assignment to a slot 51 within a slice object. Each slice object 291 defines an angular region around the circumference of the compass 82. Those slots 292 appearing within the slice object 291 are identified. A spine label 293 is assigned to the slot 292 corresponding to the cluster spine having the closest angularity to the slot 292.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing a dynamic user interface for a dense three-dimensional scene, comprising:
a database to store a three-dimensional scene to logically hold clusters, each cluster also stored in the database and comprising one or more concepts, arranged proximal to each other such cluster to form a cluster spine;
a two-dimensional display to display each cluster spine projected relative to a stationary perspective; and
a user interface provided by a heads-up display generator, comprising:
controls to operate on a view of the cluster spines in the display;
a compass to frame the cluster spines within the display; and
a generator to specify a label that identifies one such concept in one or more of the cluster spines appearing within the compass, wherein a plurality of slots in the two-dimensional display are positioned circumferentially around the compass and each label is assigned to the slot outside of the compass for the cluster spine having a closest angularity to the slot.

2. The system according to claim 1, wherein the view of the cluster spines in the display is reoriented via the heads-up display generator in response to user input to the controls.

3. The system according to claim 2, wherein the reorientation via the heads-up display generator is selected from the group comprising zooming and panning the view of the cluster spines.

4. The system according to claim 1, further comprising:
a slice object defined via the heads-up display generator for the concepts in each of the cluster spines presenting a selection user control, wherein each slice object is associated to the slot assigned to the label corresponding to the concept defined for the slice object, and upon selection of the label in the display in response to user input to the controls, the concept displayed is emphasized.

5. The system according to claim 4, further comprising:
a pin control defined via the heads-up display generator to pin a cluster spine onto the compass upon selection of the label in the display in response to user input to the controls.

6. The system according to claim 4, further comprising:
a reclustering control to recluster new clusters via a clustering component in response to user input to the controls based on the cluster spines currently projected in the display.

7. The system according to claim 6, wherein one or more of the clusters are organized via a clustering component into groupings.

8. The system according to claim 7, wherein a revised set of clusters corresponding to the grouping are placed via a cluster spine placement component in the display.

9. The system according to claim 1, wherein the display of at least one cluster spine appearing within the compass is emphasized upon selection of at least one such cluster within the cluster spine.

10. The system according to claim 1, wherein the display of each cluster appearing outside of the compass is deemphasized.

11. A method for providing a dynamic user interface for a dense three-dimensional scene, comprising:
    placing clusters stored in a database, each cluster comprising one or more concepts, in a three-dimensional scene stored in the database arranged proximal to each other such cluster to form a cluster spine;
    projecting each cluster spine into a two-dimensional display relative to a stationary perspective;
    presenting controls via a heads-up display generator operating on a view of the cluster spines in the display and providing a compass via the heads-up display generator logically framing the cluster spines within the display;
    generating a label via the heads-up display generator to identify one such concept in one or more of the cluster spines appearing within the compass; and
    defining a plurality of slots via the heads-up display generator in the two-dimensional display positioned circumferentially around the compass and assigning each label to the slot outside of the compass for the cluster spine having a closest angularity to the slot.

12. The method according to claim 11, further comprising:
    reorienting the view of the cluster spines via the heads-up display generator in the display in response to user input to the controls.

13. The method according to claim 12, further comprising:
    providing reorientation via the heads-up display generator selected from the group comprising zooming and panning the view of the cluster spines.

14. The method according to claim 11, further comprising:
    defining a slice object via the heads-up display generator for the concepts in each of the cluster spines presenting a selection user control;
    associating each slice object via the heads-up display generator to the slot assigned to the label corresponding to the concept defined for the slice object; and
    upon selection of the label in the display in response to user input to the controls, emphasizing the concept displayed.

15. The method according to claim 14, further comprising:
    pinning a cluster spine via the heads-up display generator onto the compass upon selection of the label in the display in response to user input to the controls.

16. The method according to claim 14, further comprising:
    forming new clusters via a clustering component in response to user input to the controls based on the cluster spines currently projected in the display.

17. The method according to claim 16, further comprising:
    organizing groupings via a clustering component of one or more of the clusters.

18. The method according to claim 17, further comprising:
    placing a revised set of clusters via a cluster spine placement component corresponding to the grouping in the display.

19. The method according to claim 11, further comprising:
    emphasizing the display of at least one cluster spine appearing within the compass upon selection of at least one such cluster within the cluster spine.

20. The method according to claim 11, further comprising:
    deemphasizing the display of each cluster appearing outside of the compass.

21. A computer-readable storage medium holding code for performing the method according to claim 11.

* * * * *